United States Patent [19]

Blaha et al.

[11] Patent Number: 5,729,600
[45] Date of Patent: Mar. 17, 1998

[54] AUTOMATIC CALL DISTRIBUTOR WITH AUTOMATED VOICE RESPONSIVE CALL SERVICING SYSTEM AND METHOD

[75] Inventors: David L. Blaha, Aurora; Brian J. Shapley, Woodridge, both of Ill.

[73] Assignee: Rockwell International Corporation, Costa Mesa, Calif.

[21] Appl. No.: 904,410

[22] Filed: Jun. 25, 1992

[51] Int. Cl.$^6$ .................... H04Q 3/64; H04M 1/64; H04M 15/00; H04M 3/00
[52] U.S. Cl. ............ 379/265; 379/70; 379/73; 379/88; 379/127; 379/243; 379/246; 379/309
[58] Field of Search .................... 379/67, 88, 201, 379/214, 243, 258, 269, 265, 266, 309, 233, 127, 89, 70, 73, 84, 246

[56] References Cited

U.S. PATENT DOCUMENTS

| | | | |
|---|---|---|---|
| 4,757,267 | 7/1988 | Riskin | 379/113 |
| 4,763,353 | 8/1988 | Canale et al. | 379/265 X |
| 4,797,910 | 1/1989 | Daudelin | 379/67 |
| 4,797,911 | 1/1989 | Szlam et al. | 379/246 X |
| 4,845,739 | 7/1989 | Katz | 379/104 |
| 4,926,462 | 5/1990 | Ladd et al. | 379/67 |
| 4,951,310 | 8/1990 | Honda | 379/266 |
| 4,996,704 | 2/1991 | Brunson | 379/245 X |
| 5,023,868 | 6/1991 | Davidson | 379/89 X |
| 5,036,535 | 7/1991 | Gechter | 379/210 |
| 5,097,528 | 3/1992 | Gursahaney et al. | 379/96 |
| 5,103,449 | 4/1992 | Jollissaint | 379/127 |
| 5,113,430 | 5/1992 | Richardson, Jr. | 379/94 |
| 5,128,984 | 7/1992 | Katz | 379/142 |
| 5,136,633 | 8/1992 | Tejada et al. | 379/97 X |
| 5,185,782 | 2/1993 | Srinivasan | 379/214 |
| 5,309,505 | 5/1994 | Szlam | 379/77 |
| 5,317,627 | 5/1994 | Richardson, Jr. | 379/94 |
| 5,335,269 | 8/1994 | Steinlicht | 379/309 X |
| 5,351,285 | 9/1994 | Katz | 379/97 |

Primary Examiner—Harry S. Hong
Attorney, Agent, or Firm—Welsh & Katz, Ltd.

[57] ABSTRACT

An automatic call distributor (10) with a switch (12) which interconnects customer telephonic units (14A) of an external telephonic network (14B) with an internal network of agent units (16) having an automated call servicing system including a voice response unit (18) with a plurality of stored scripts for servicing different types of calls from customers automatically in response to call type identification signals, such as Dial Number Identification System (DNIS) numbers, corresponding to the different types of calls associated with the different stored scripts of the voice response unit (18) to automatically service a plurality of different types of calls without customer prompting while also functioning to respond to customer prompting when no DNIS number or other call type identification is provided with the call.

31 Claims, 2 Drawing Sheets

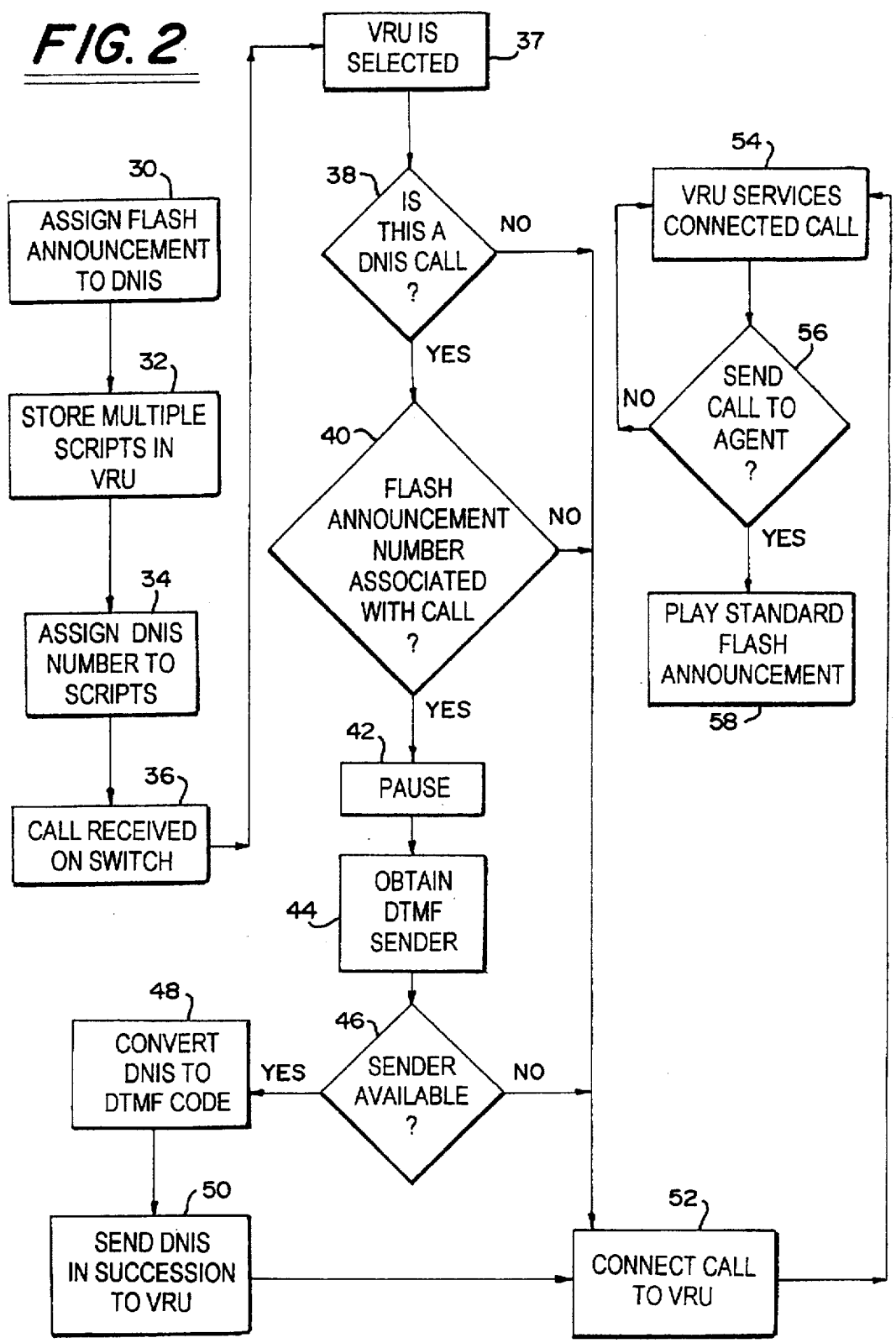

AUTOMATIC CALL DISTRIBUTOR WITH AUTOMATED VOICE RESPONSIVE CALL SERVICING SYSTEM AND METHOD

BACKGROUND OF THE INVENTION

1. Field of the Invention

This invention relates generally to the field of automatic telephonic call distributors and, more particularly, to an automatic call distributor system with a voice response unit for responding to incoming calls from an external telephonic network.

2. Description of the Related Art Including Information Disclosed Under 37 C.F.R. §1.97–1.99

Automatic call distributors employing a switch for selectively interconnecting a plurality of customer units of an external telephonic network with a plurality of agent units of an internal network of the call distributor are well known. Examples of such are shown in U.S. Pat. No. 5,268,903 of Jones et al. entitled "Multichannel Telephonic Switching Network with Different Signaling Formats and Connect/PBX Treatment Selectable For Each Channel", issued Dec. 7, 1993; U S. Pat. No. 5,140,611 of Jones et al. entitled "Pulse Modulated Self-Clocking and Self-Synchronizing Data Transmission and Method for a Telephonic Communication Switching System", issued Aug. 18, 1992; U.S. Pat. No. 5,127,004 of Lenihan et al. entitled "Tone and Announcement Message Code Generator for a Telephonic Switching System an Method", issued Jun. 30, 1992. It is also known in such distributors to use many voice response units to service different types of calls connected from customer units of an external telephonic network. Disadvantageously, however, in these known distributors a single voice response unit is capable of servicing only one type of call without additional prompting from the customer. These voice response units respond to prompts initiated by the user and conveyed by the central processing unit to provide different predetermined voice messages to the caller. Often automatic call distributors used for telemarketing programs have many different toll free, or 1-800, telephone numbers corresponding to the different types of services the user provides or different applications (i.e., a toll free number for sales in general or with respect to different products, a toll free number for inventory, a toll free number for customer service, etc.). A single agent is often responsible for servicing a number of these different types of calls relating to different customer needs or different types of customers.

Unfortunately, in these known systems a different voice response unit is needed to manage each different type of call in order to avoid undesirable prompting which reveals to the caller that the agent is not working exclusively on an application relating to a customer's need. If a user has five different toll free numbers corresponding to five different applications being serviced by the call distributor, five different voice response units are needed to service these different types of calls. Since each voice response unit requires a computing capability comparable to that of a personal computer, the incremental cost for increasing the number of different applications which can be simultaneously run through the call distributor during any one period is substantial.

Because each voice response unit is dedicated to only a single application in these known distributors, each voice response unit is capable of servicing only one type of incoming call. If a voice response unit is in the process of servicing its assigned type of call, such as a general sales call for one type of product, all other subsequent connected calls of the same type (general sales calls for the same type product) will have to wait until the voice response unit completes its servicing of the originally connected call. During this waiting period, other voice response units dedicated to servicing other types of calls sit in an idle state if the distributor has no incoming calls desiring the particular application associated with those voice response units. This disadvantageously results in a long response times for calls of the same application and inefficient use of available equipment.

SUMMARY OF THE INVENTION

Accordingly, it is the principal object of the present invention to provide an automatic call distributor system with an automated voice responsive call servicing system and method in which the disadvantages of known call distributors with voice response units and methods are overcome by dynamically controlling a single voice response unit to service a multiplicity of different types of incoming calls automatically without the need for customer prompting indicating the type of call.

The object is achieved in part by providing an automatic call distributor having a switch for selectively interconnecting a plurality of customer units of an external telephonic network with agent units of an internal network of the call distributor with an automated voice responsive call servicing system comprising a voice response unit having a plurality of stored scripts, means for associating call type identification signals with the stored scripts of the voice response unit and means for causing the voice response unit to operate in accordance with the stored scripts in response to receipt of call type identification signals of a call connected to the voice response unit. In the preferred embodiment, the call type identification signals represents a Dialed Number Identification Service, or DNIS, number which is generated by the external network.

The objective is also achieved in part by providing in conjunction with an automatic call distributor having a switch for selectively interconnecting a plurality of customer units of an external telephonic network with a plurality of agent units of an internal network of a call distributor with a method of automatically servicing calls from a plurality of customer units of an external telephonic network comprising the steps of (1) storing a plurality of scripts in a voice response unit, (2) associating call type identification signals with the stored scripts of the voice response unit and (3) causing the voice response unit to operate in accordance with the stored scripts in response to receipt of the call type identification signals of a call connected to the voice response unit.

The object of the invention is also achieved in part by providing an automatic call distributor with a switch for selectively interconnecting a plurality of customer units of an external telephonic network with a plurality of agent units of an internal network of the call distributor with an automated voice responsive call servicing system, comprising a voice response unit having both nonprompting scripts that do not require prompting with respect to information provided by virtue of call type identification signals received by the voice response unit and prompting scripts, means responsive to receipt of a call together with the call type identification signals from the external network to cause the voice response unit to execute an associated nonprompting script and means responsive to receipt of a call without call type identification signals from the external network to cause the voice response unit to execute an associated prompting script.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which:

FIG. 2 is a flow chart of the steps in which the preferred embodiment of the call distributor of FIG. 1 automatically services calls.

DESCRIPTION OF THE PREFERRED EMBODIMENT

Figure 1:
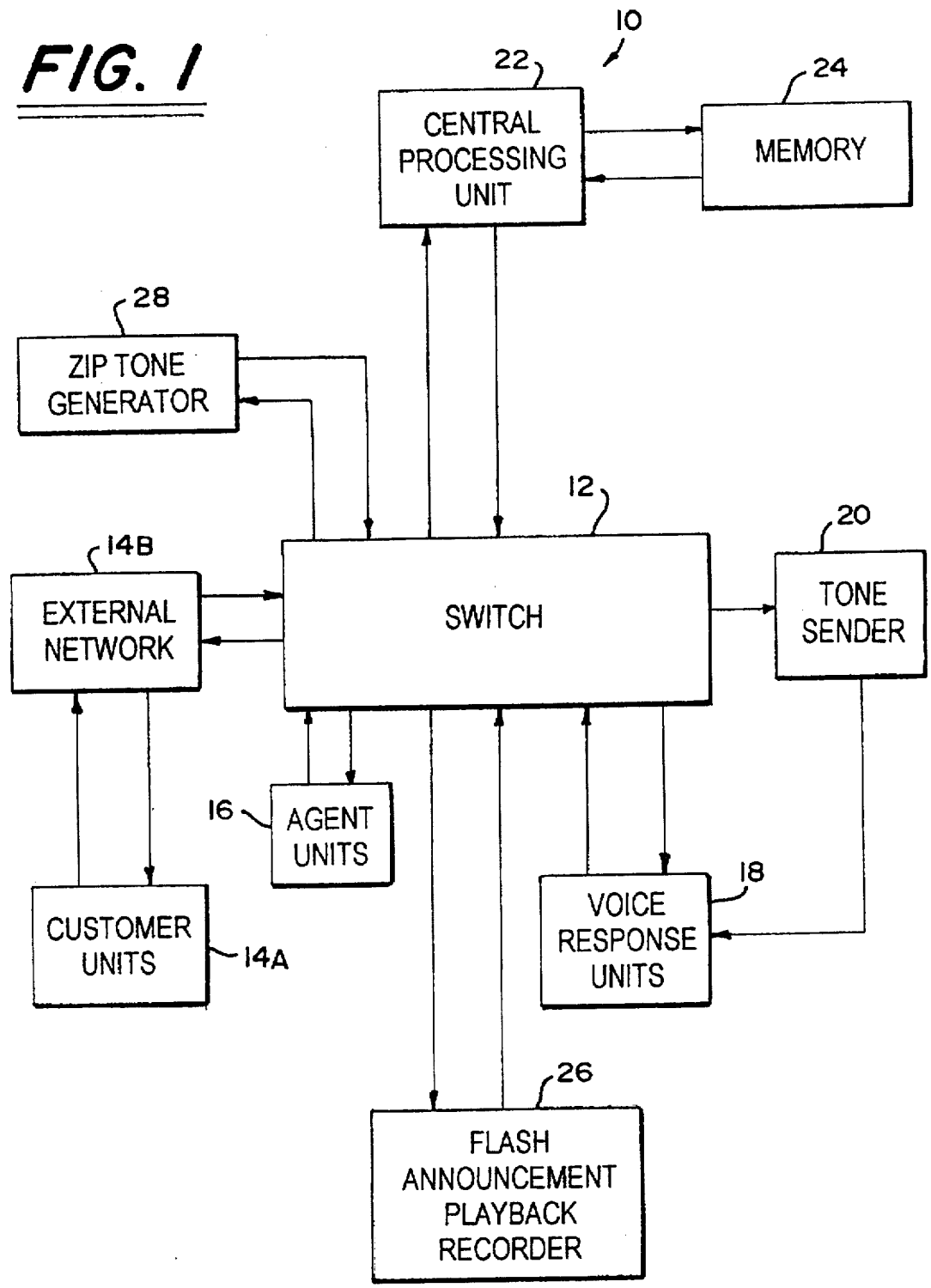
FIG. 1 is a functional block diagram of the preferred embodiment of the automatic call distributor of the present invention as interconnected with a known external network of customer telephonic units.

Referring to FIG. 1, a multiport switch 12 of the preferred embodiment of the automatic call distributor 10 of the present invention is controlled by a central processing unit 22 operating in conjunction with a main memory 24 to selectively interconnect a plurality of customer telephonic units 14A of an external telephonic network 14B with a plurality of agent units 16 of an interior telephonic network defined by switch 12. The central processing unit 22 of the preferred embodiment is either a DEC PDP 11/34, 11/44, 11/84 or 11/94 manufactured by the Digital Equipment Corporation, the switch has as many as three thousand I/O ports for connection to agent units 16, to one or more voice response units 18 and to supervisory and other units, not shown. Each voice response unit 18 preferably includes a computer having capabilities equivalent to that of a personal computer. Voice response units 18 for the preferred embodiment of the present invention are manufactured by companies such as Intervoice and Pansophic. Such voice response units are well known and are also referred to as audio voice response units or interactive voice communicators. The voice response unit 18 services the different incoming calls from the customer units 14 which are connected to the voice response unit 18 via the switch 12 by providing selected ones of the plurality voice messages to the customer unit. Generally, while the automated voice response call servicing system of the present invention can be implemented in numerous types and sizes of call distributors, it is preferably employed in a call distributor of the type shown in U.S. Pat. No. 5,268,903 of Jones et al., issued Dec. 7, 1993; U.S. Pat. No. 5,140,611 of Jones et al., issued Aug. 18, 1992; and U.S. Pat. No. 5,127,004 of Lenihan et al., issued Jun. 30, 1992.

Various types of telephone calls, such as 1-800 or toll-free calls, received from the customer units 14 frequently are assigned a different Dialed Number Identification Service (DNIS) number for each different type of call. Specifically, it is common practice for the long distance telephone carrier company of the external network 14B to assign a DNIS number to each of the different dialed numbers associated with the switch 12. Examples of such long distance carrier companies are American Telephone and Telegraph Co., MCI, Sprint, Northern Telecom, etc. Therefore, each of the different 1-800 calls is assigned a different corresponding call type identification signal or DNIS number that indicates or identifies which one of a plurality of the telephone numbers that the customer dialed to reach the multiport switch 12. The DNIS number and the call are carried concurrently to the switch 12.

In response to the call being received on a trunk termination (not shown) of the switch 12, a voice response unit 18 is selected. If there are multiple VRUs 18, the switch 12 selects one of the voice responses then by means of the central processing unit 22 causing ring voltage to be applied to the VRU 18 to place the selected VRU 18 off hook. Once the VRU 18 goes off hook, the VRU 18 has answered the call and a voice path is created between the customer unit 14A and the VRU 18 through the switch 12. After the VRU 18 goes off hook, a pause is created in order to enable the VRU time to prepare itself to receive a call type identification signal, preferably the DNIS number.

The central processing unit 22 receives the DNIS number via a communication protocol for a call on a trunk of the switch 12 and determines if there is a flash announcement number stored in the central processing unit memory 24 associated with this DNIS number. A standard flash announcement is a recorded message stored in a flash announcement play back recorder, or play recorder, 26 to alert and prepare agents to service the incoming calls such as a "General Motors used car sales call" message played to an agent for an automotive dealership company. The play recorder 26 plays and sends its prerecorded message to an agent unit 16 in response to receipt of a DNIS number recognized by the central processing unit 22 as being associated with the flash announcement number of the flash announcement play back recorder 26 and its recorded flash announcement.

In the preferred embodiment, if there is no flash announcement number associated with the DNIS number, then the call is connected directly to the VRU 18 in order for the VRU 18 to service the call. However, in such case, the DNIS numbers are not transferred to the VRU 18, and the VRU 18 initiates a prompting script to obtain customer information for the VRU 18 to determine if it is capable of servicing the call itself. For example, a VRU 18 will play a stored automated message to the connected customer unit 14A directing the customer to "Press number one on your keypad for automotive sales, press number two on your keypad for automotive customer service, press three on your keypad for general brochure information, stay on the line if you do not have a touch tone telephone or press zero and an agent will assist you." If the customer presses keypad number one for sales, the VRU will initiate another stored prompting message such as "press number one for new car sales or number two for used car sales". The voice response unit will initiate its prompting script each time the customer provides information to narrow down the selection of choices until the customer obtains the information which he desires. If a determination is made that the VRU 18 is not capable of servicing the call, it sends the connected call to the agent. Thus, in keeping with one aspect of the invention the VRU 18 has two different modes of operation depending upon whether it receives a DNIS number.

If there is a flash announcement number in the memory 24 which corresponds to the DNIS number received at the switch 12, then the central processing unit 22 directs the switch 12 to seize a dual tone multiple frequency (DTMF) sender, or tone sender, 20. If no tone sender 20 is available, after a preselected period of time, the call on the trunk of the switch 12 is directly connected to the VRU 18.

If a tone sender 20 is seized, the call type DNIS number is sent to the tone sender 20 to convert the DNIS number to a DTMF tone code suitable for processing by the voice response unit 18. The tone sender 20 has a plurality of registers which convert the DNIS number to a corresponding DTMF tone code. Once the conversion is complete, the tone sender 20 sends, or outdials, the DTMF tone code to the voice response unit 18.

After receipt of the DTMF tone code from the tone sender 20, the call on the trunk of the switch 12 is connected to the voice response unit 18. The voice response unit 18 services the call based on the coding of the particular stored script associated with the call type identification signals received by the VRU 18 and which correspond to the connected call. Alternatively, the VRU 18 sends the call to an agent unit 16 or services the call itself. The VRU 18 services the call by playing to a customer unit 14A the messages of script associated with the call type identification signals according to how the VRU 18 has been programmed to service the call.

The voice response unit 18 plays a stored automated message to the connected customer unit 14A. Alternatively, an associated nonprompting script is executed by the voice response unit in response to the receipt of the call together with the DNIS number as a DTMF tone code. The stored automated message is preferably a customer greeting which is played without any prompting from the customer unit 14A. Since the call is connected with an associated DNIS number, the VRU 18 plays the particular automated message or greeting corresponding to the type of call. For example, if a customer calls a General Motors Customer Service number to an automotive dealership servicing cars from many different car companies, an example customer greeting will be "Welcome to General Motors Customer Service." The VRU plays the General Motors greeting as opposed to a Jaguar, BMW, or Mercedes stored greeting because of the receipt of the DNIS number identifying a General Motors customer service call. Since known automatic call distributor systems do not carry a DNIS number along with its associated call, the VRU 18 is not capable of identifying the type of connected call (i.e. a General Motors, a Jaguar or BMW type customer call) without any additional prompting, identifying the call, from the customer.

The voice response unit 18, preferably executes a nonprompting script associated with the DNIS number in response to its receipt of a connected call with the corresponding DNIS number. A nonprompting script as that term is used herein is intended to mean any script that does not require any prompting from the customer with respect to information provided by virtue of the DNIS number even though prompting for other information is also required. A prompt is not needed to be provided by the customer to identify the type of call because the receipt of the DNIS number identifies the type of call to the VRU 18. Thus, the VRU 18 is capable of collecting information from the customer and services the call automatically.

If the VRU 18 transfers the call to an agent unit 16, the agent unit will receive the standard flash announcement, if a flash announcement number is assigned for the transferred call. A standard flash announcement is a recorded message received by an agent stationed at an agent unit 16 to inform the agent of the type of call which he will receive. For example, an automobile dealership selling and servicing many types of automobiles is utilizing the call distributor system 10 the recorder 26 plays a "General Motors Customer Service call" message to an agent in response to a customer calling a General Motors Customer Service number. The standard flash announcements which are sent to the agent units 16 are visual signals, aural signals or both depending on the physical communication capabilities of the agent unit 16 receiving the call.

The DNIS number received by the switch 12 is typically a multidigit call type identification number having four digits. However, long distance carriers are known to send call type identification numbers or DNIS numbers having more or less than four digits. The multiple digits of the DNIS number sent to the VRU 18 via DTMF tone code are sent in succession with the first digit being sent first. A preselected pause is established between the time the voice response unit 18 becomes off hook and is connected to the switch 12 and the time when the digits are sent to the VRU. This pause preferably is substantially equal to the length of a zip tone which is preferably a buzz tone that is sent to an agent unit 16 to attract the attention of an agent before the call is connected for two way communication. The duration of the zip tone and thus the duration of the pause are both preferably as short as possible, and range from two hundred and fifty to three thousand milliseconds. The zip tone buzz signal is generated by a separate zip tone generator 28 which is connected to the agent units 16 through the switch 12. Once a call is connected to the selected agent unit 16 receiving the call, the standard flash announcement is presented to the agent unit 16.

While the advantages of the invention are preferably obtained with the automatic call distributor 10 described above with reference to FIG. 1, the method of the invention can be practiced with any other automated call distributors having a switch for selectively interconnecting a plurality of customer units of an external telephonic network to a plurality of agent units of an internal telephonic network of the call distributor. In any event, the steps of the preferred method of practicing the invention comprise the steps of (1) storing a plurality of scripts in a voice response unit, (2) associating call type identification signals with the stored scripts of the voice response unit, and (3) causing the voice response unit to operate in accordance with the stored scripts in response to receiving the call type identification signals corresponding to the call which is connected to the voice response unit.

Referring also to FIG. 2, this method is preferably performed in the automatic call distributor 10 of FIG. 1 by assigning a flash announcement number in the central processing unit memory 24 to a corresponding DNIS number in step 30. The DNIS numbers are assigned to different types of calls by the long distance carrier company of the exterior telephonic network 14, FIG. 1. The call type identification signals, preferably the DNIS number, is carried along with its associated call to the switch 12 of the automatic call distributor 10. In step 32 of FIG. 2, multiple scripts are programmed and stored in the voice response unit 18, FIG. 1. In response to receipt of a DNIS number via DTMF tones, the VRU 18 operates to service the connected call in accordance with the stored scripts in step 54. The DNIS numbers associated with the various types of different calls are assigned corresponding stored scripts in step 34, FIG. 2, in order to relate the stored scripts with the various different types of calls. Assigning a flash announcement number to a corresponding DNIS number in step 30, storing of multiple scripts in the voice response unit 18 in step 32 and assignment of a DNIS number to a corresponding stored script in step 34 are all completed within the automatic call distributor 10 prior to the receipt of a call from the external telephonic network 14B.

In step 36, FIG. 2, a call coming from a customer unit 14A of the external telephonic network is received by the switch 12, FIG. 1. In step 37, the switch 12 selects a voice response unit 18 by means of the central processing unit 22 providing an instruction for ringing voltage to be applied to the VRU to cause the VRU to come off hook. A voice path is created between the switch 12 and the VRU 18 once the VRU comes off hook.

In response to receipt of a call on a trunk of the switch 12, step 36, FIG. 2, the central processing unit 22 determines if there is a DNIS number associated with the call in step 38. If the call on a trunk of the switch 12, FIG. 1, does not have a corresponding DNIS number, thus not being a DNIS type call, the call is connected directly to the VRU 18 in step 52. The VRU 18 initiates its prompting script in order to obtain information about the customer. Based on this information originating by the prompting of the customer unit 14A, the VRU 18 transfers the call to an agent unit 16 if the VRU determines it cannot service the call on its own.

If the call on the switch 12 is a DNIS call having an associated DNIS number, then in step 40, FIG. 2, the central processing unit 22 receives the DNIS number via a communication protocol to see if there is a corresponding flash announcement number stored in memory 24 of the central processing unit 22. If there is no flash announcement number associated with the DNIS number, the DNIS number is prevented from being sent to the VRU 18, and the call is connected directly to the VRU 18 in order for the VRU 18 to service the call. If there is a flash announcement number, a preselected pause is established in step 42 to allow the voice response unit 18, FIG. 1, to prepare itself for receipt of the DNIS number as DTMF tones.

If the call on the switch 12, FIG. 1, has a DNIS number with an associated flash announcement number in the memory 24, then the central processing unit 22 directs the switch 12 to obtain a dual tone multiple frequency (DTMF) tone sender 20, FIG. 1, in step 44 of FIG. 2. The central processing unit 22, FIG. 1, determines if a tone sender 20 is available in step 46, FIG. 2. If no tone sender is available after a preselected period of time, such as fifty milliseconds, then the call is connected directly to the VRU 18 in step 52. If a tone sender 20, FIG. 1, is available, step 48, FIG. 2, the DNIS number is sent to the tone sender 20 and converted to a corresponding DTMF tone code. In step 50, FIG. 2, the tone sender 20, FIG. 1, sends the DTMF tone code to the voice response unit 18. The DNIS number is preferably a multidigit number, and the digits are sent to the voice response unit via a DTMF tone code in successive order with the first digit sent first.

Once the DNIS number is sent to the voice response unit 18, the DNIS call having an associated flash announcement number on the switch 12, FIG. 1, is connected to the voice response unit 18 in step 52, FIG. 2. In step 54, the VRU 18 services the connected call based on the coding of the particular stored scripts contained in the VRU 18. According to the particular stored script corresponding to the received DNIS number, the VRU 18 determines whether it will service the connected call itself or transfer the call to an agent unit 16 in step 56, FIG. 2. In step 58, a standard flash announcement associated with the DNIS number is played to the agent set 16, if the call is transferred to an agent. The standard flash announcement is played to the agent in the same fashion as if the call had originally been connected to the agent.

Thus, it is seen that the present invention overcomes the disadvantages of known automatic call distributors. Each of the VRUs 18 within the automatic call distributor system 10 to each be able to service many different types of calls. As opposed to known systems, the VRUs 18 do not have to be dedicated to only a single application. Since a plurality of the VRUs 18 in the invention are capable of servicing many different types of calls, there is generally a much larger pool of VRUs to service a call of any particular type at any given time. Response times for servicing a call are reduced because if one VRU 18 is in the process of handling a call of one type, another VRU waiting in queue can immediately service a call of the same type. Due to the added flexibility of the invention relative to know distributors, the service of calls is enhanced and the number of VRUs required for multiple applications is reduced.

While a detailed description of the preferred embodiment of the invention has been given, it should be appreciated that many variations can be made thereto without departing from the scope of the invention as set forth in the appended claims.

We claim:

1. In an automatic call distributor with a switch for selectively interconnecting a plurality of customer units of an external telephonic network with a plurality of agent units of an internal network of the call distributor, the improvement being an automated voice responsive call servicing system, comprising:

a voice response unit having a plurality of different stored scripts corresponding to a plurality of different types of connected calls;

means for associating different call type identification signals from the external network with different ones of the stored scripts of the voice response unit;

means for causing the voice response unit to operate in accordance with the different ones of the stored scripts automatically in response to receipt of the different call type identification signals associated with the different stored scripts to automatically respond to the plurality of different types of connected calls; and means for providing an agent with a standard flash announcement in response to one of the plurality of different types of connected calls being transferred to the agent.

2. The automated voice responsive call servicing system of claim 1 including another voice response unit and means for selectively causing the voice response units to each service the plurality of different types of connected calls.

3. The automated voice responsive call servicing system of claim 1 in which the call type identification signals represent a DNIS number received from the customer units of the external telephonic network.

4. The automated voice responsive call servicing system of claim 3 in which the DNIS number is a multidigit call type identification number.

5. The automated voice responsive call servicing system of claim 4 in which the multiple digits are sent in succession to the voice response unit.

6. The automated voice responsive call servicing system of claim 1 in which the causing means includes means for automatically playing to the customer unit a stored message associated with the call type identification signals.

7. In an automatic call distributor with a switch for selectively interconnecting a plurality of customer units of an external telephonic network with a plurality of agent units of an internal network of the call distributor, the improvement being an automated voice responsive call servicing system, comprising:

a voice response unit having a plurality of stored scripts;

means for associating the call type identification signals which represent a DNIS number received from the customer units of the external telephonic network with the stored scripts of the voice response unit;

means for converting the DNIS number to a DTMF tone code corresponding to one of the plurality of associated stored scripts; and means for causing the voice response unit to operate in accordance with the different ones of the stored scripts in response to receipt of the call type identification signals of a call connected to the voice response unit.

8. The automated voice responsive call servicing system of claim 7 in which the converting means includes a tone sender for changing the DNIS number represented in a nontonal code to the corresponding DTMF tone code.

9. The automated voice responsive call servicing system of claim 7 including means for sending the DTMF tone code to the voice response unit.

10. The automated voice responsive call servicing system of claim 9 including means for establishing a preselected pause between the connection of the voice response unit to the switch and the sending of the DTMF tone code.

11. The automated voice responsive call servicing system of claim 10 in which the pause is substantially equal to the length of a zip tone sent to an agent unit prior to connection thereto of a call from a customer unit.

12. In an automatic call distributor with a switch for selectively interconnecting a plurality of customer units of an external telephonic network with a plurality of agent units of an internal network of the call distributor, the improvement being an automated voice responsive call servicing system, comprising:

a voice response unit having a plurality of stored scripts;

means for associating a call type identification which represent a DNIS number received from the customer units of the external telephonic network with the stored scripts of the voice response unit;

means for assigning a preselected flash announcement to the DNIS number; and means for causing the voice response unit to operate in accordance with the stored scripts in response to receipt of the call type identification signals of a call connected to the voice response unit.

13. The automated voice responsive call servicing system of claim 12 including means responsive to receipt of a DNIS number without the assigned preselected flash announcement number for preventing the DNIS number from being sent to the voice response unit.

14. In an automatic call distributor with a switch for selectively interconnecting a plurality of customer units of an external telephonic network with a plurality of agent units of an internal network of the call distributor, the improvement being an automated voice responsive call servicing system, comprising:

a voice response unit having a plurality of stored scripts;

means for associating call type identification which represent a DNIS number received from the customer units of the external telephonic network with the stored scripts of the voice response unit, the DNIS number being a multidigit call type identification number having four digits; and means for causing the voice response unit to operate in accordance with the stored scripts in response to receipt of the call identification signals of a call connected to the voice response unit.

15. In an automatic call distributor with a switch for selectively interconnecting a plurality of customer units of an external telephonic network with a plurality of agent units of an internal network of the call distributor, the improvement being an automated voice responsive call servicing system, comprising:

a voice response unit having a plurality of stored scripts;

means for associating call type identification signals with the stored scripts of the voice response unit;

means for causing the voice response unit to operate in accordance with the stored scripts in response to receipt of the call type identification signals of a call connected to the voice response unit; and means for providing an agent with a standard flash announcement which is at least one of visual and aural in response to the voice response to the voice response unit transferring a call to the agent.

16. In an automatic call distributor with a switch for selectively interconnecting a plurality of customer units of an external telephonic network with a plurality of agent units of an internal network of the call distributor, the improvement being a method of automatically servicing calls, comprising the steps of:

storing a plurality of different scripts corresponding to a plurality of different types of connected calls in a voice response unit;

associating different call type identification signals from the external network with different ones of the stored scripts of the voice response unit;

causing the voice response unit to operate in accordance with the different ones of the stored scripts automatically in response to receipt of the different ones of the different call type identification signals associated with the different stored scripts to automatically respond to the plurality of different types of connected calls; and providing an agent a standard flash announcement in response to one of the plurality to different types of connected calls being transferred to the agent.

17. The automatic call servicing method of claim 16 including the step of causing a plurality of voice response units to each service the plurality of different types of connected calls.

18. The automatic call servicing method of claim 16 in which the call type identification signals define a DNIS number received from the external telephonic network.

19. The automatic call servicing method of claim 18 in which the DNIS number has multiple digits and includes the step of sending the multiple digits in succession to the voice response unit.

20. The automatic call servicing method of claim 16 in which the step of causing includes the step of playing a stored automated message associated with the call type identification signals to the customer units.

21. In an automatic call distributor with a switch for selectively interconnecting a plurality of customer units of an external telephonic network with a plurality of agent units of an internal network of the call distributor, the improvement being a method of automatically servicing calls comprising the steps of:

storing a plurality of scripts in a voice response unit;

associating call type identification signals which define a DNIS number received from the external telephonic network with the stored scripts of the voice response unit;

converting the DNIS number to a DTMF tone code corresponding to one of the plurality of associated stored scripts; and causing the voice response unit to operate in accordance with the stored scripts in response to receipt of the DNIS number of a call connected to the voice response unit.

22. The automatic call servicing method of claim 21 including the step of sending the DTMF tone code to the voice response unit.

23. The automatic call servicing method of claim 22 including the step of establishing a preselected pause between the connection of the voice response unit to the switch and the sending of the DTMF tone code.

24. In an automatic call distributor with a switch for selectively interconnecting a plurality of customer units of an external telephonic network with a plurality of agent units of an internal network of the call distributor, the improvement being a method of automatically servicing calls, comprising the steps of:

storing a plurality of scripts in a voice response unit;

associating call type identification signals which define a DNIS number received from the external telephonic network with the stored scripts of the voice response unit;

causing the voice response unit to operate in accordance with the stored scripts in response to receipt of the call type identification signals of a call connected to the voice response unit; and assigning a flash announcement number to the DNIS number.

25. The automatic call servicing method of claim 24 including the step of preventing the DNIS number from being sent to the voice response unit in response to receipt of a DNIS number without an assigned flash announcement number.

26. In an automatic call distributor with a switch for selectively interconnecting a plurality of customer units of an external telephonic network with a plurality of agent units of an internal network of the call distributor, the improvement being an automated voice responsive call servicing system, comprising:

a voice response unit having both nonprompting scripts that do not require prompting with respect to information provided by virtue of call type identification signals received by the voice response unit and prompting scripts;

means responsive to receipt of a call together with the call type identification signals from the external network to cause the voice response unit to execute an associated nonprompting script; and means responsive to receipt of a call without call type identification signals from the external network to cause the voice response unit to execute an associated prompting script.

27. The automated voice responsive call servicing system of claim 26 including means for transferring the call to an agent unit in response to a determination by the voice response unit that it cannot service the call.

28. The automated voice responsive call servicing system of claim 27 including means for providing an agent with a standard flash announcement in response to the voice response unit transferring the call to the agent unit when a determination is made that it cannot service the call.

29. The automated voice responsive call servicing system of claim 26 in which the call type identification signals represent a DNIS number received from the external telephonic network.

30. In an automatic call distributor with a switch for selectively interconnecting a plurality of customer units of an external telephonic network with a plurality of agent units of an internal network of the call distributor, the improvement being an automated voice responsive call servicing system, comprising:

a voice response unit having both nonprompting scripts that do not require prompting with respect to information provided by virtue of call type identification signals which represent a DNIS number received from the external telephonic network and received by the voice response unit and prompting scripts;

means for converting the DNIS number to a corresponding DTMF tone;

means responsive to receipt of a call together with the call type identification signals from the external network to cause the voice response unit to execute an associated nonprompting script; and means responsive to receipt of a call without call type identification signals from the external network to cause the voice response unit to execute an associated prompting script.

31. The automated voice responsive call servicing system of claim 30 including means for sending the DTMF tone code to the voice response unit.

\* \* \* \* \*